US006810676B2

(12) United States Patent
O'Connor (10) Patent No.: US 6,810,676 B2
(45) Date of Patent: Nov. 2, 2004

(54) METHOD OF ENGINE STARTING IN A GAS TURBINE ENGINE

(75) Inventor: Richard John O'Connor, Gloucester (CA)

(73) Assignee: Pratt & Whitney Canada Corp., Longueuil (CA)

( * ) Notice: Subject to any disclaimer, the term of this patent is extended or adjusted under 35 U.S.C. 154(b) by 96 days.

(21) Appl. No.: 10/016,869

(22) Filed: Dec. 14, 2001

(65) Prior Publication Data

US 2003/0110777 A1 Jun. 19, 2003

(51) Int. Cl.[7] .................................................. F02C 7/22
(52) U.S. Cl. ............................ 60/778; 60/786; 60/790
(58) Field of Search ........................... 60/772, 778, 786, 60/790, 39.183, 39.34, 39.64, 773, 776, 784, 788, 793

(56) References Cited

U.S. PATENT DOCUMENTS

| | | | |
|---|---|---|---|
| 3,059,427 A | * 10/1962 | Thorpe et al. ............. 60/39.14 |
| 3,667,218 A | 6/1972 | Davis |
| 3,844,112 A | 10/1974 | Harrison |
| 4,044,554 A | 8/1977 | West |
| 4,350,008 A | 9/1982 | Zickwolf, Jr. |
| 4,464,895 A | * 8/1984 | Morrison et al. ......... 60/39.141 |
| 4,566,266 A | 1/1986 | Kidd et al. |
| 5,107,674 A | 4/1992 | Wibbelsman et al. |
| 5,253,470 A | 10/1993 | Newton |
| 5,369,948 A | 12/1994 | Vertens et al. |
| 5,628,185 A | 5/1997 | Rowe |
| 5,718,111 A | 2/1998 | Ling et al. |
| 5,907,949 A | * 6/1999 | Falke et al. ................ 60/39.06 |
| 6,062,016 A | * 5/2000 | Edelman .................... 60/39.06 |
| 6,182,438 B1 | 2/2001 | Weber |

FOREIGN PATENT DOCUMENTS

| | | |
|---|---|---|
| EP | 0 399 692 | 11/1990 |
| EP | 0 856 651 A2 | 8/1998 |

* cited by examiner

Primary Examiner—Charles G. Freay
(74) Attorney, Agent, or Firm—Wayne H. Yan; Ogilvy Renault (57) ABSTRACT

A method of engine starting in a gas turbine engine comprises rotating the engine to provide an air flow into a combustor of the engine and injecting fuel into the combustor at a varying rate until the engine is lighted-off. The varying rate of the fuel flow is a function of time and is represented by a curve having at least one high frequency with respect to a light-off time, representing instant changes of the rate for intersecting a light-off zone while reducing a quantity of fuel injected into the combustor. After the light-off occurrence fuel is continuously injected into the combustor to accelerate the engine to a self-sustaining operation condition. This method of the present invention is adapted to find light-off points under various temperature and altitude conditions, thereby advantageously providing a rapid light-off, particularly under cold weather conditions.

14 Claims, 5 Drawing Sheets

METHOD OF ENGINE STARTING IN A GAS TURBINE ENGINE

FIELD OF THE INVENTION

This invention relates to the general field of gas turbine engines and more particularly, to a method of achieving light-off fuel flow under a variety of altitude and temperature conditions.

BACKGROUND OF THE INVENTION

In a gas turbine engine, inlet air is continuously compressed, mixed with fuel in an inflammable proportion, and then exposed to an ignition source to ignite the mixture which will then continue to burn in order to generate the combustion product.

The starting of a gas turbine engine is a complex process and generally includes two stages. In the first stage, the gas turbine engine is rotated by a torque provided by an external source, for example, by a starter. When a predetermined compressor pressure or speed is reached, fuel flow is injected at a controlled rate into the combustor to mix with the air flow and the mixture is exposed to an ignition source and eventually ignition occurs. In the second stage the fuel flow is continuously injected into the combustor, enabling the local ignition to propagate and spread in order to form stable combustion in the combustor. During the second stage, the engine speed is accelerated by increasing the fuel flow injection until the engine operates under a self-sustained speed.

As part of engine design testing procedures, gas turbine engines must be able to start under conditions involving a range of temperatures and altitudes. Altitudes can vary from as low as a few thousand feet below sea level to altitudes that are greater than 65,000 ft. above sea level. Temperatures can range from −60 degrees F. to +135 degrees F.

The typical engine fuel control will provide a fixed starting fuel flow for light-off based on the ambient pressure and ambient temperature. In the case of in-flight re-lights, the effects of ram may also be input into the fuel control system in order to further bias the fuel flow for light-off.

The engine's requirements for light-off fuel delivery vary significantly with engine size, the number of nozzles, the type of nozzles used, the altitude, the temperature of the air and fuel, the viscous and aerodynamic drag effects on the rotors and the forward velocity of the engine. Increasing altitude causes a rarefying of the air and a need to reduce the light-off fuel flow. Very cold temperatures cause a need for higher fuel flows in order to achieve light-off. In particular, at very cold, high altitude static starts, a high light-off fuel flow requirement may be needed in order to initiate light-off. However, sustaining this flow may result in overtemperatures in the turbine area and the associated stresses that follow. In addition, this high fuel flow required for light-off may lead to visual flame being emitted from the jet pipe or exhaust of the engine. Longer light-off times may result in fuel pooling. Once this pooled fuel finally burns, visible torching may result. This torching is highly undesirable as it may also lead to engine distress on the turbine blading.

Efforts have been made in the industry to improve gas turbine engine starting, particularly for reducing light-off time which is taken from the point of fuel injection to the light-off occurrence, in order to have a quick start-up of the engine. U.S. Pat. No. 5,718,111, issued to Ling et al. on Feb. 17, 1998, as an example of such efforts, describes a gas turbine engine start-up control system and method in which the engine exit temperature and the compressor speed change rate are sensed, and the sensed parameters are compared with desired start-up characteristics and referenced to look-up tables for determining an output composition factor. Based on the output composition factor, the start-up of the gas turbine engine is adjusted, generally by adjusting fuel flow through use of a fuel control system. However, this method and system are generally used for controlling fuel flow in the second stage of engine start-up because the engine exit temperature changes after the light-off occurrence.

U.S. Pat. No. 6,062,016, issued to Edelman on May 16, 2000 discloses a gas turbine engine light-off system and method in which the gas turbine engine is operated at a fixed speed in order to provide a substantially constant supply of combustion air for light-off, and the fuel flow is ramped up to achieve the correct fuel-to-air ratio for light-off.

U.S. Pat. No. 5,107,674, issued to Wibbelsman et al. on Apr. 28, 1992 describes a starting system for a gas turbine aircraft engine. The starting system automatically controls the sequencing of events needed during engine start-up that lead up to light-off, including sensors for ambient temperature, exhaust gas temperature, compressor speed, fuel flow, etc. The control schedules fuel flow in a manner which avoids stalls and takes corrective action when stalls occur, and provides scheduling of fuel flow in severely cold conditions.

U.S. Pat. No. 5,369,948, issued to Vertens et al. on Dec. 6, 1994 describes a process and apparatus for starting a gas turbine engine. In this apparatus with a start-up controller for a gas turbine engine, the amount of fuel injected by controlled dosing pumps is determined, whereby the amount of fuel injected can be regulated as a function of the difference between the injection pressure and the compressor pressure in the combustion chamber of the turbine, or at the compressor outlet.

Nevertheless, there is still a need for a better engine starting method for reducing light-off time of engine start-up and for avoiding injection of excess fuel during engine start-up, particularly under cold weather conditions because the fuel accuracy of achieving light-off of gas turbine engines becomes more critical as the fuel and air temperature get colder.

SUMMARY OF THE INVENTION

A method of engine starting in a gas turbine engine according to one aspect of the present invention comprises steps of rotating the engine to provide an air flow into a combustor of the engine, and injecting fuel into the combustor at a varying rate until the engine is lighted-off. The varying rate of fuel injection is a function of time and is represented by a curve having at least one high frequency which represents instant changes of the rate for intersecting a light-off zone. The curve preferably further has a low frequency with respect to the light-off time, representing a change trend of the varying rate. After the light-off occurrence the engine is accelerated to a self sustaining operation condition by continuously injecting fuel into the combustor. The engine may be rotated at a varying speed as a function of time, such as an increasing speed, or rotated at a fixed speed, in order to achieve light-off. The curve for intersecting a light-off zone preferably has an increasing trend and comprises, for example, an oscillatory profile, a squared-off wave profile, a step profile or a series of spikes, according to various embodiments.

The mixture of fuel and air can be ignited, which is generally referred to as light-off, in the combustor of a gas turbine engine with a fuel/air ratio falling within an appropriate range. This fuel/air ratio range for light-off is affected by fuel viscosity, atmospheric temperature, and atmospheric air pressure. The air pressure is primarily determined by the compressor speed and the altitude where the gas turbine engine is positioned. During gas turbine operation, including the start up procedure thereof, the air flow entering the combustor and mixing with the fuel is driven by the engine compressor, and thereby the air flow rate is a function of the compressor speed or the engine speed. Thus, the fuel/air ratio range for light-off is primarily determined by a light-off zone of a fuel flow rate and an engine speed rate. The light-off zone is affected by the atmospheric temperature and the altitude where the engine is positioned. This will be further discussed hereinafter. Therefore, it is usually difficult to achieve a quick light-off under various temperature and altitude conditions, particularly in cold weather unless the precise light-off zone can be identified under those conditions.

In contrast to the conventional manner of fuel injection for light-off, in which the fuel injection rate is generally represented by a linear or monotonic curve, the present invention provides a novel manner of injecting fuel into the combustor for achieving light-off in which fuel is injected at a varying rate which can be represented by a curve having at least one high frequency, for example, an oscillatory profile representing instant changes of the rate providing various instant fuel/air ratios in order to locate the light-off zone associated with the specific temperature and altitude conditions while reducing the quantity of fuel injected into the combustor. This will be further discussed with reference to the drawings and embodiments hereinafter.

In one embodiment of the present invention, a plurality of sensors are provided to measure the temperatures of the fuel and air flow to be injected into the combustor, the forward flight velocity ram quantity which is measured as the pressure difference between the inlet and outlet of the gas turbine engine, and the speed of the engine. The measured data is processed to determine a minimum engine speed at which the introduction of a predetermined first fuel flow level begins. The temperature of the exhaust gas flow is also measured to determine if light-off occurs. The light-off time is measured and stored in a database along with all other measurement data for reference in a future light-off of the gas turbine engine occurring under similar altitude and temperature conditions. Thus, the predetermined first fuel flow level, the criteria for the minimum engine speed for the introduction of the predetermined first fuel flow level, and the profile of the curve representing the varying fuel injection rate can be adjusted to achieve a shorter light-off time based on the information stored in the database.

The foundation of the present invention is based in part on the principle that "at any given air mass flow, the range of air/fuel ratio within which the mixture can be ignited is smaller than that for which stable combustion is possible once ignition has occurred". This principle is stated in "Gas Turbine Theory by H. Cohen, G. F. C. Rogers and H. I. H. Saravanamuttoo". The increasingly oscillatory light-off fuel flow will intersect the light-off zone and once the engine is lighted-off, the combustion will be sustained at a lower fuel flow because light-off of the fuel/air mixture occurs at a particular moment within a very small local area such that a light-off occurrence is primarily determined by the instant fuel/air ratio, or by the instant fuel flow rate. On the other hand, stable combustion is more effectively determined by the average fuel/air ratio or by the average fuel flow rate. The average fuel flow of every cycle of the light-off fuel flow is lower than the maximum fuel flow rate in the same cycle. Thus, quick light-off of a gas turbine engine can be achieved and continuous combustion can be sustained even in very cold weather, and excess fuel injection can thereby be avoided.

Other advantages and features of the present invention will be better understood with reference to preferred embodiments and drawings of the present invention described hereinafter.

BRIEF DESCRIPTION OF THE DRAWINGS

Having thus generally described the nature of the present invention, reference will now be made to the accompanying drawings, showing by way of illustration the preferred embodiments thereof, in which.

DETAILED DESCRIPTION OF THE PREFERRED EMBODIMENTS

Figure 1:
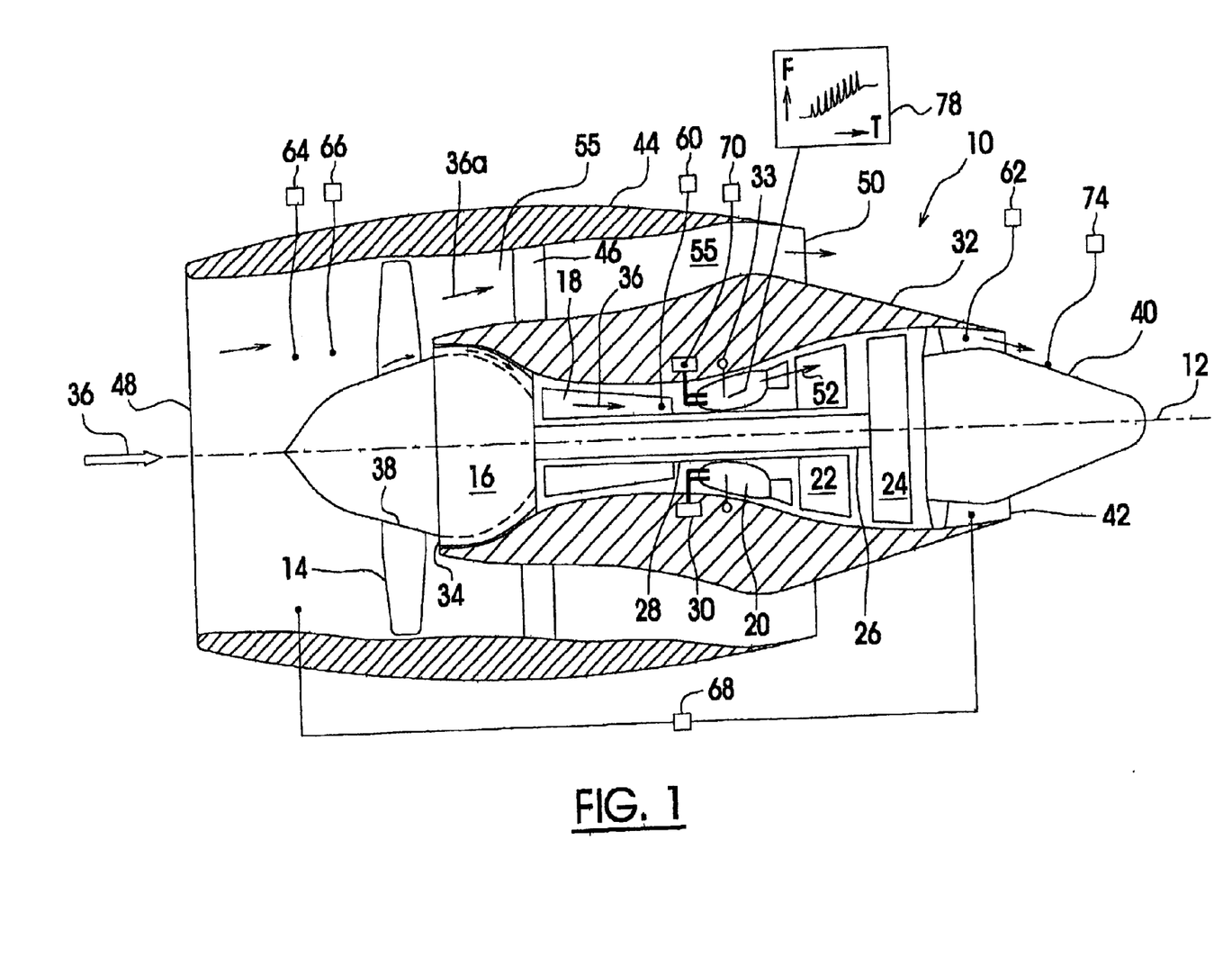
FIG. 1 is a cross-sectional view of a gas turbine engine incorporating a preferred embodiment of the present invention.

Referring to the drawings, particularly FIG. 1, an exemplary gas turbine engine 10 includes in serial flow communication about a longitudinal centerline axis 12, a fan having a plurality of circumferentially spaced apart fan or rotor blades 14, a conventional low pressure compressor 16, a conventional high pressure compressor 18, a conventional annular combustor 20, a conventional high pressure turbine 22 and a conventional low pressure turbine 24. The low pressure turbine 24 is securely connected to both the low pressure compressor 16 and the fan blades 14 by a first rotor shaft 26, and the high pressure turbine 22 is securely connected to the high pressure compressor 18 by a second rotor shaft 28. Conventional fuel injection means 30 are provided for selectively injecting fuel flow into the combustor 20 for powering the engine 10. A spark igniter 33 is provided in the combustor 20 in close proximity to the fuel nozzles (not indicated by numerals) of the fuel injection means 30.

A conventional annular casing 32 surrounds the engine 10 from the low pressure compressor 16 to the low pressure turbine 24 and defines, with the low pressure compressor 16, a low pressure compressor inlet 34 for receiving a portion of ambient air represented by arrows 36. The downstream end of the casing 32 defines with a conventional annular exhaust plug 40, an annular exhaust outlet 42. A portion of the ambient air 36 compressed by the fan blades 14 adjacent to the blade roots 38 is further compressed by the low pressure compressor 16 and the high pressure compressor 18 and is forced into the combustor 20. The mixture of the compressed air 36 and the fuel injected by the fuel injecting means 30 generates combustion gases represented by arrows 52. The combustion gases 52 cause the high pressure turbine 22 and the low pressure turbine 24 to rotate respectively for powering the high pressure compressor 18, the low pressure compressor 16 and the fan blades 14.

Surrounding the blades 14 and the upstream portion of the casing 32 is a nacelle 44 which is spaced radially outwardly from the casing 32 defining with the casing 32, an annular duct 55 for permitting the radially outer portion of the air 36 compressed by the blades 14, to bypass the engine. For convenience of description this bypass air flow is indicated by arrows 36a. A plurality of circumferentially spaced stator vanes 46 extend radially between the casing 32 and the nacelle 44, and are spaced apart axially downstream from the blades 14. The nacelle 44 includes an inlet 48 at its upstream end for receiving the ambient air 36, and an outlet 50 at its downstream end for discharging the bypass air flow 36a for providing a portion of thrust.

Figure 2:
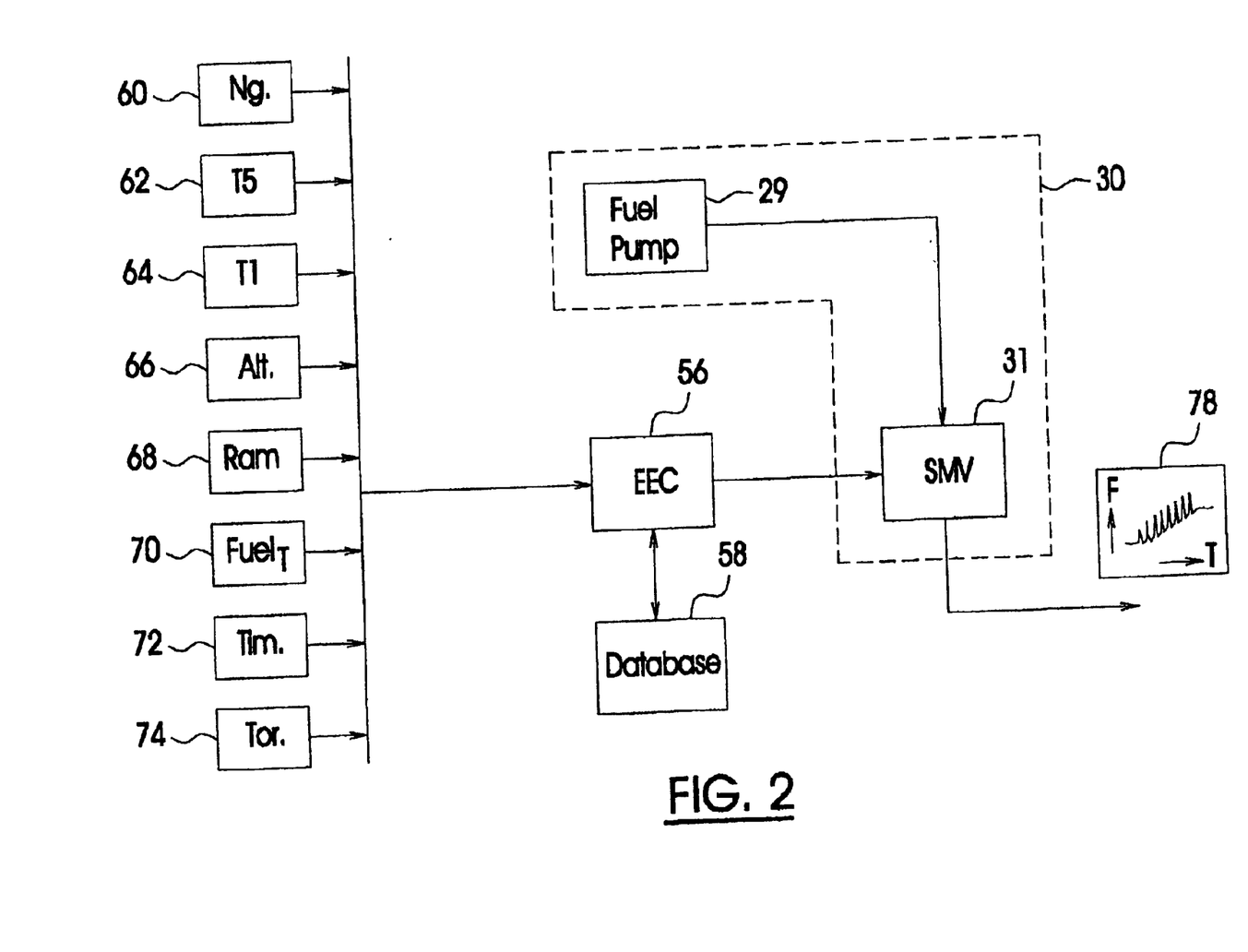
FIG. 2 is a simplified diagram illustrating an engine starting method according to the embodiment of FIG. 1.

Reference will now be made to both FIGS. 1 and 2. During a start-up process of the engine 10, the engine 10, more particularly the high pressure compressor 18 of the engine 10 is rotated by a starter (not shown) to provide the air flow 36 into the combustor 20. A sensor (not shown) associated with the high pressure compressor 18 measures the rotational speed of the high pressure compressor 18 and sends a speed signal which is represented by block 60 to an electronic engine controller 56. When a minimum rotational speed of the high pressure compressor 18 according to predetermined criteria, is reached, the electronic engine control 56 signals the fuel injecting means 30 which includes the fuel pump 29 and a stepper, or torque motor valve 31, or an equivalent function valve to begin injection of a fuel flow into the combustor which, for example, has an increasingly oscillating profile as illustrated in block 78 in which F represent Fuel Flow and T represents Time. The mixture of fuel and air having a varying fuel/air ratio contacts the spark igniter 33, causing light-off of the combustion process in the combustor 20 when an appropriate fuel/air ratio is reached. In order to determine a light-off occurrence, an exhaust temperature signal represented by block 62 is sent to the electronic engine control 56 by a temperature sensor (not shown) associated with the annular exhaust outlet 42. When a threshold temperature of 200° F., for example, is measured, the electronic engine control 56 signals the fuel injecting means 30 to inject fuel flow according to a fuel schedule required for the engine operation from the light-off point to a self-sustaining condition, which is based on current known profiles. This fuel schedule could follow an open loop fuel flow profile based on a desired rate of acceleration or could be based on a limiting exhaust temperature signal 62 as pertains to a specific engine application.

During the light-off procedure, the electronic engine control 56 also receives a temperature signal 64 of the ambient inlet air 36, an altitude signal 66 indicated by the altitude pressure of the inlet air, a ram signal 68 which is a measurement of the forward velocity or pressure differential existing across the engine 10, and a fuel temperature signal 70. These signals are used by the electronic engine control 56 to select an appropriate fuel flow profile for the light-off procedure. A timing signal 72 generated from a timer circuit (not shown) integrated in the electronic engine control 56 is used for measuring the light-off time which is taken from the point of the beginning of the fuel injection to the light-off occurrence. A torching signal 74 is an optional ultraviolet or photoelectric signal which indicates the presence of visible flames at the exhaust outlet 42 of the engine 10. A database 58 is provided with the electronic engine control 56 for storing all data sensed or measured as well as other predetermined data and programs.

The engine starting method is further discussed in principle and is described in detail with reference to FIGS. 3–6. The fuel flow at a varying rate injected into the combustor to reach light-off is a function of time and is represented by a curve 76, as shown with the coordinates of flow rate (F) and time (T) in FIG. 3, having a lower frequency representing a change trend of the fuel flow rate and at least one high frequency representing instant changes of the flow rate. The time duration between $T_2$ and $T_1$ is the light-off time where the fuel injection begins at time $T_1$ and the light-off occurs at $T_2$.

Figures 3, 3A:
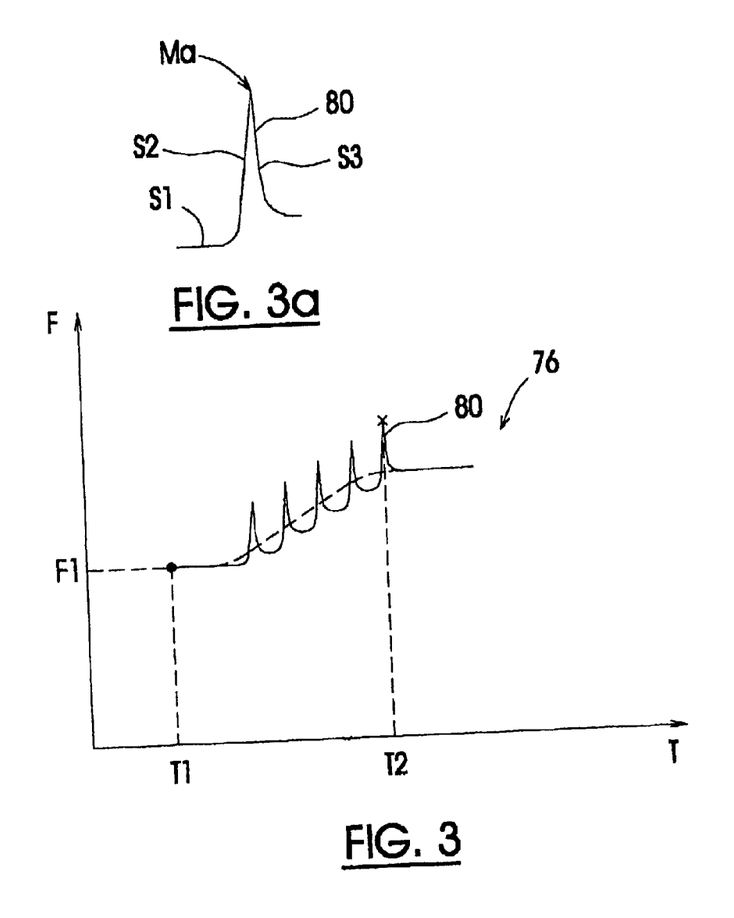
FIG. 3 is a graphical representation showing a fuel injection profile used in the embodiment of FIG. 1.
FIG. 3a is a graphical representation showing the details of the fuel injection profile of FIG. 3.

The low frequency of the curve 76 has a cycle time duration much greater than the light-off time, or the time duration between $T_2$ and $T_1$ so that the low frequency of the curve 76 generally represents the changing average flow rate which filters the high frequency components and is illustrated by the broken line section of the curve 76. In this embodiment of the present invention, the change trend of the fuel flow rate represents an increasing trend. However, the curve 76 may not necessarily include the low frequency. With a self-learning function incorporated into this engine starting method, a rapid light-off can be achieved without the change trend of the varying fuel flow rate. This will be further described hereinafter.

Figure 3B:
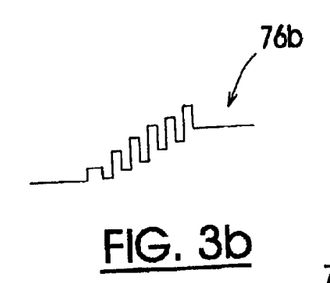
FIGS. 3b–3d are graphical representations showing various fuel flow profiles according to various embodiments of the present invention.
Figure 3C:
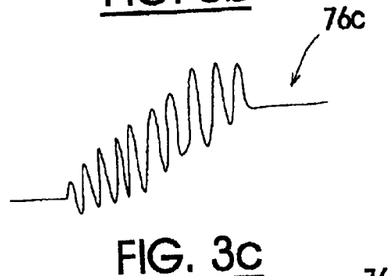
Figure 3D:
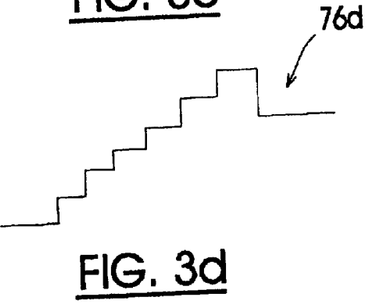

The at least one high frequency curve 76 in this embodiment comprises an increasingly oscillating profile and more particularly, comprises a series of spikes 80 which, as more clearly illustrated in FIG. 3a, generally include a relatively low and steady flow rate section $S_1$ and a rapidly and instantly increasing section $S_2$ to reach an instant maximum flow rate $M_a$ as well as a decreasing section $S_3$ representing a smooth change of the fuel rate, instantly and rapidly decreasing from the instant maximum flow rate $M_a$ to a relatively low and stable flow rate of the next cycle of the spikes. Nevertheless, the at least one high frequency curve 76 could vary, as represented by, for example, a squared-off profile 76b as shown in FIG. 3b, a generally oscillatory profile such as a random oscillation profile 76c, as shown in FIG. 3c, or a step profile 76d as shown in FIG. 3d.

It is noted that on one hand, light-off occurs within a very brief moment and is generally determined by the instant fuel/air ratio, and on the other hand, a stable combustion process generally depends on the average fuel/air ratio. It is a generally accepted principle that at any given air mass flow, the range of air/fuel ratio within which the mixture can be ignited is smaller than that for which stable combustion is possible once ignition has occurred. The varying fuel rate represented by the curve 76 having high frequency components advantageously provides a plurality of instant maximum fuel flow rates, while maintaining the average flow rate at a gradually changing level relatively lower than those instant maximum fuel flow rates. When the air flow rate into the combustor 20 is fixed or changes in a relatively stable manner, the fuel/air ratios are determined primarily by the properties of the curve 76. These instant maximum fuel flow rates ensure the relative smaller air/fuel ratio for light-off, and the low average fuel flow level ensures a relative greater air/fuel ratio for stable combustion. Therefore, the increasingly oscillating fuel flow rate represented by curve 76 provides a novel light-off fuel flow profile which meets the light-off requirements stated in this principle.

The fuel flow rate curve 76 generally includes a predetermined first fuel flow level $F_1$ which is only maintained for a short period of time and then changes to the oscillating profile. The predetermined first fuel flow level $F_1$ and the beginning time $T_1$ of the fuel flow injection as well as other properties of the fuel flow curve 76 are determined according to the altitude and temperature conditions under which the engine 10 is started. This will be further described hereinafter.

Figure 4:
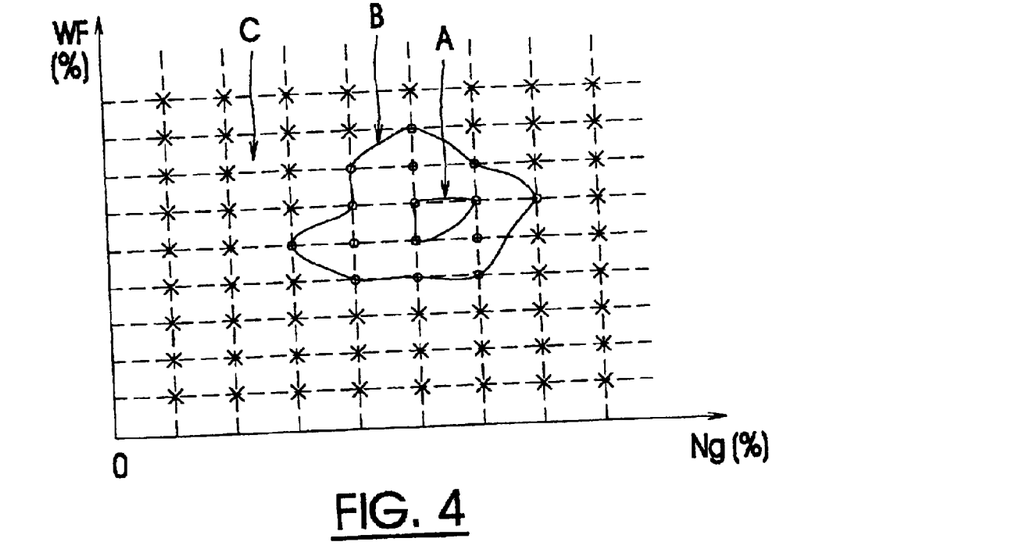
FIG. 4 is a graphical representation showing a light-off zone defined by the fuel flow rate and the engine rotational speed rate.

FIG. 4 illustrates the relationship between the light-off occurrence and the fuel flow rate as a percentage of the fuel flow rate indicated by WF (%), and gas generator speed as a percentage of a full gas generator speed, indicated by Ng (%). It is understood that the gas generator speed in FIG. 4 is equivalent to the rotational speed of the high pressure compressor 18 of the engine. In FIG. 4 the fuel flow is injected into the combustor at varying rates, and the air flow is compressed into the combustor at varying rates which correspond to the gas generator speed rates. Thus, varying fuel/air ratios can be obtained and are represented as cross points by the vertical and horizontal lines. Nevertheless, only those cross points representing the appropriate fuel/air ratios meet the requirements for light-off under particular altitude and temperature conditions. These cross points represent an area defined by the closed circle B. The cross points representing fuel/air ratios at which light-off does not occur define the area C surrounding the area B. The light-off area B which will be referred to as the light-off zone hereinafter, includes a range of fuel/air ratios at which light-off can occur. However, the light-off time at different fuel/air ratios is different. Generally, the light-off times at the fuel/air ratios represented by the cross points within the light-off zone and close to the boundary thereof are longer than the light-off times at the fuel/air ratios represented by the cross points close to the center of the light-off zone. Thus, a central area defined by the closed circle A illustrates a smaller range of fuel/air ratios for a more rapid light-off.

Figure 5:
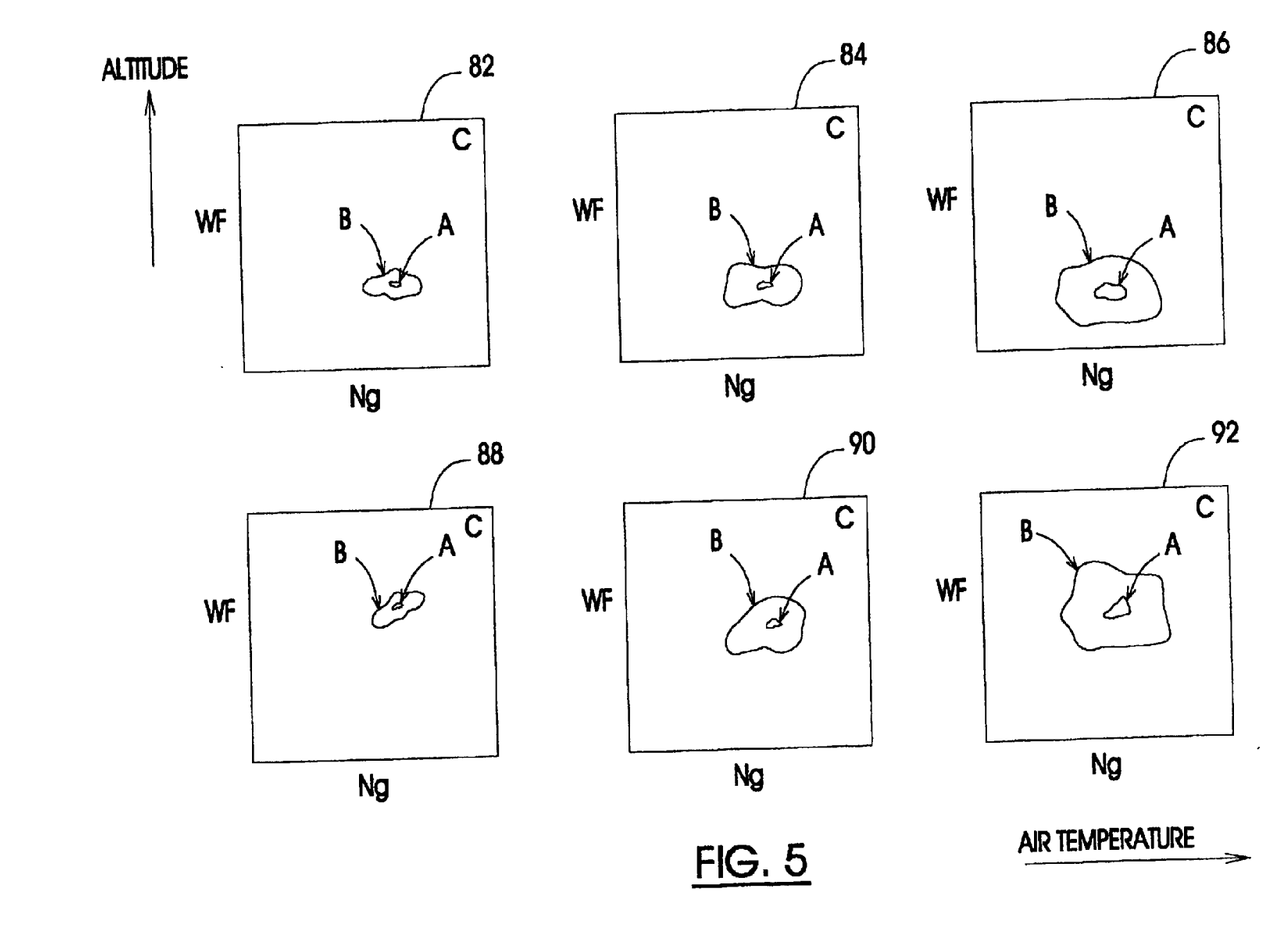
FIG. 5 is a schematic representation, showing changes of a light-off zone affected by temperatures and altitudes.

FIG. 5 is a schematic, graphical representation showing the light-off zones under various altitude and temperature conditions in which the light-off zones are schematically illustrated for discussion purposes only, and are not the direct results of testing. The ambient air temperature not only directly affects the temperature of the air flow, fuel flow and thereby the temperature of the mixture injected into the combustor, but also affects the density of the air which thereby affects the actual fuel/air ratio when the fuel flow rate and the engine generator speed are fixed. The ambient air pressure is varied at different altitudes which changes the density of the ambient air, thereby affecting the actual fuel/air ratio. Thus, the light-off zone will change when either altitude or ambient temperature conditions change. The light-off zones 82–92 illustrated in FIG. 5 are the respective samples of FIG. 4 under various temperature and altitude conditions. The general effect of temperature at high altitudes on the light-off boundary is illustrated in the high altitude cold temperature zone 82, the high altitude moderate temperature zone 84, and the high altitude hot temperature zone 86. The general effect of temperature at low altitudes on the light-off boundary is illustrated in the low altitude cold temperature zone 88, the low altitude moderate temperature zone 90 and the low altitude hot temperature zone 92. It is shown that at a fixed altitude condition the light-off zone B becomes smaller and the position of the light-off zone B with respect to the coordinates of the fuel flow and gas generator speed changes when the ambient air temperature becomes colder. The light-off zone B also changes in its shape and position when the altitude changes but the ambient air temperature remains relatively constant. Therefore, parameters determining the fuel flow rate curve 76 in FIG. 3 must be changed in response to the changes in altitude and temperature conditions in order to achieve a rapid light-off.

Figure 6:
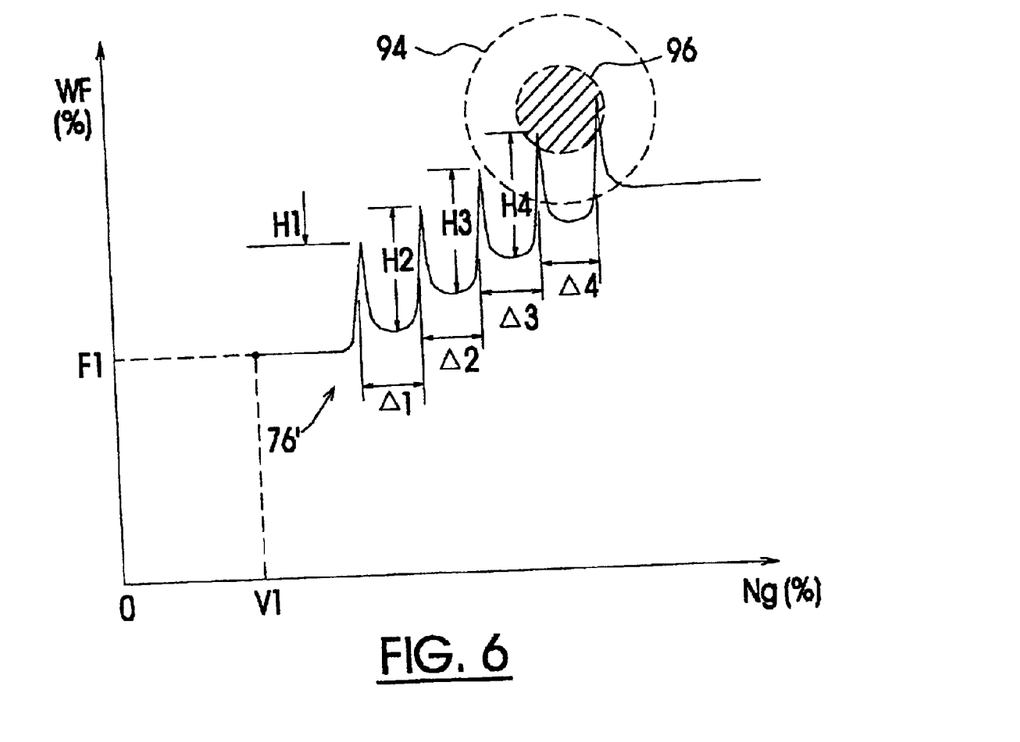
FIG. 6 is a geographical representation showing a fuel flow intersecting a light-off zone according to one embodiment of the present invention.

The fuel flow rate curve 76 shown in FIG. 3 is a function of time. During a start-up process, the gas generator speed gradually increases and is also a function of time. Therefore, the varying fuel flow rate as a function of time can be changed to a function of gas generator speed by applying a mathematic calculation, and thereby the fuel flow rate curve 76 in FIG. 3 is converted to a corresponding fuel flow rate curve 76' with reference to the coordinates fuel flow percentage WF (%) and the gas generator speed percentage NG (%), shown in FIG. 6. A hypothetical light-off zone 94 and its central area 96 for rapid light-off are also shown in FIG. 6.

It will be understood that when the fuel flow rate curve 76' intersects the light-off zone 94 or its central area 96, the requirements for light-off are met and light-off occurs. However, the accurate point within the hypothetical light-off zone 94 at which the light-off occurs varies, depending on the parameters of the curve 76' and other conditions. As illustrated in FIG. 5, the size, shape and position of the light-off zone vary under different altitude and temperature conditions. Therefore, it is difficult to locate light-off under various altitude and temperature conditions, especially in very cold weather because the light-off zone is relatively smaller. The spike profile or the other profiles of the curve shown in FIGS. 3b–3d sweeps an area when the average fuel flow rate increases so that the curve 76' advantageously provides more possibilities to intersect the hypothetical light-off zone or its central area 96, in contrast to a varying fuel flow rate represented by a linear or a monotonic curve which is used in prior art to intersect the light-off zone for engine combustion light-off.

The hypothetical light-off zone 94 and its central area 96 are changed in shape, area and position when the altitude and temperature conditions vary, and so the parameters determining the curve 76' must be changed accordingly. These parameters are minimum gas generator speed $V_1$ to begin the engine injection and the predetermined first fuel flow level $F_1$ when the fuel injection begins. The parameters also include $\Delta_1$, $\Delta_2$, $\Delta_3$, $\Delta_4$, etc. of gas generator speed increments and $H_1$, $H_2$, $H_3$, $H_4$, etc. of fuel flow increments with respect to the circles or spikes of the curve 76' as shown in FIG. 6. These increments may be equal, exponential or logarithmic, depending on the results of empirical testing. Initially, the minimum gas generator speed $V_1$ and the first level fuel flow $F_1$ as well as the increments $\Delta$ and H associated with various altitude and temperature conditions are predetermined by empirical testing. During a light-off process under a specific altitude and temperature condition, the temperature of the fuel and the temperature of the air flow, a forward flight velocity ram quantity and an ambient air pressure, as well as the gas generator speed, are sensed. This sensed data is sent to the electronic engine control to determine the minimum gas generator speed $V_1$ for the introduction of the predetermined first fuel flow level $F_1$. The electronic engine control processes this sensed data to further select other parameters of the light-off flow rate curve 76', such as the first fuel flow level $F_1$ the fuel increments H and the gas generator speed increments $\Delta$ from the empirical testing data stored in the database, in order to determine an appropriate profile of the light-off fuel flow curve 76', thereby achieving a rapid light-off under that particular altitude and temperature condition. The light-off time is then measured and that information is stored in the database for future reference.

In a future light-off process, all sensed data is compared with data generated in previous light-off processes to determine if the data associated with an altitude and temperature condition similar to a current altitude and temperature condition exists. If the search result is positive, then the parameters of the light-off fuel flow curve 76' used in the previous light-off process under similar altitude and temperature condition will be used to determine the information about the hypothetical light-off zone 94 and its central area 96. Based on the newly determined information about the light-off zone 94 and its central area 96 under this particular altitude and temperature condition, the electronic engine control selects new parameters of $F_1$, $V_1$, H, $\Delta$, etc. of the light-off fuel flow curve 76' so that the commencement point of the curve 76' is closer to the hypothetical light-off zone 94 and its central area 96, and the profile of the curve 76' is also better in order to achieve a light-off occurrence. The light-off time is measured and compared with the stored light-off time of the previous light-off process under the same altitude and temperature condition. If the current light-off time is shorter than the previous light-off time, all the currently sensed data are stored in the database to replace the previously stored data. If the current light-off time is longer than the previously stored light-off data, the currently sensed data is not stored. Thus, a self-learning function is incorporated into the engine starting light-off method of the present invention. With such a self-learning function, the optimized curve 76' may not necessarily include the low frequency representing the change trend of the varying fuel flow rate because only one or a few more cycles of the high frequency oscillation may successfully cause the light-off occurrence. The parameters H and A of the cycles however, may vary.

It is noted that in the above described embodiment of the present invention, the gas generator speed increases during the light-off time. This is one example of the present invention which is convenient for discussion. The present invention is also applicable when the generator speed is fixed during the light-off time.

Modifications and improvements to the above-described embodiment of the present invention may become apparent to those skilled in the art. The foregoing description is intended to be exemplary rather than limiting. For example, instead of the gas turbine engine having an annular combustor as described in the embodiment, the present invention can be used with different types of engines such as gas turbine engines having separate combustion liners. The scope of the invention is therefore intended to be limited solely by the scope of the appended claims.

I claim:

1. A method of engine starting in a gas turbine engine comprising:
    rotating the engine at an increasing speed as a function of time to accelerate the engine and provide an air flow into a combustor of the engine;
    injecting fuel into the combustor at a varying rate during the acceleration of the engine until the engine is lighted-off, the varying rate being a function of time and represented by a curve having at least one high frequency with respect to a light-off time, representing instant changes of the rate for intersecting a light-off zone while reducing a quantity of fuel injected into the combustor; and then,
    continuously injecting fuel into the combustor to accelerate the engine to a self-sustaining operation condition.

2. A method as claimed in claim 1 wherein the curve comprises a low frequency with respect to the light-off time, representing a change trend of the varying rate.

3. A method as claimed in claim 1 wherein the curve has an increasing trend and comprises an oscillatory profile.

4. A method as claimed in claim 1 wherein the curve has an increasing trend and comprises a series of spikes.

5. A method as claimed in claim 1 wherein the curve has an increasing trend and comprises a squared-off wave profile.

6. A method as claimed in claim 1 wherein the curve has an increasing trend and comprises a step profile.

7. A method as claimed in claim 1 further comprising introduction of a predetermined first fuel flow level into the combustor prior to fuel injection at the varying rate.

8. A method as claimed in claim 7 further comprising: selecting a minimum engine speed to begin the introduction of the predetermined first fuel flow level for starting the engine under a variety of altitude and temperature conditions.

9. A method as claimed in claim 8 further comprising:
    sensing a temperature of the fuel to be injected into the combustor;
    sensing a temperature of the air flow to be provided into the combustor;
    sensing a forward flight velocity ram quantity;
    sensing an ambient air pressure;
    sensing the varying speed of the engine; and
    processing the sensed data to determine the minimum engine speed for the introduction of the predetermined first fuel flow level.

10. A method as claimed in claim 9 further comprising:
    measuring a light-off time taken from the beginning of the introduction of the predetermined first fuel flow level, to the occurrence of the light-off; and
    storing the measured light-Off time and the sensed data in a database for reference in a future engine starting process when a search shows no data associated with an altitude and temperature condition, similar to a current altitude and temperature condition generated in a previous light-Off process and stored in the database.

11. A method as claimed in claim 10 further comprising:
    changing a criterion of the minimum engine speed and the predetermined first fuel flow level to reduce the light-off time according to the stored data associated with the similar altitude and temperature condition, when such data is located in the database; and
    storing data regarding the changes and the light-off time currently measured, and deleting the previously stored data of the minimum engine speed and the predetermined first fuel flow level and the previously stored light-off time associated with thin similar altitude and temperature condition, when the current light-off time is shorter than the previously stored light-off time.

12. A method as claimed in claim 1 further comprising: sensing a temperature of an exhaust gas flow to determine if the light-off occurs.

13. A method as claimed in claim 1 further comprising: biasing a profile of the curve representing the varying fuel injection rate according to changes in the altitude and temperature conditions.

14. A method as claimed in claim 1 further comprising: changing the predetermined first fuel flow level according to changes in the altitude and temperature conditions.

* * * * *